(No Model.)
A. W. CASH.
NIPPLE CHUCK.
No. 452,770.  Patented May 26, 1891.
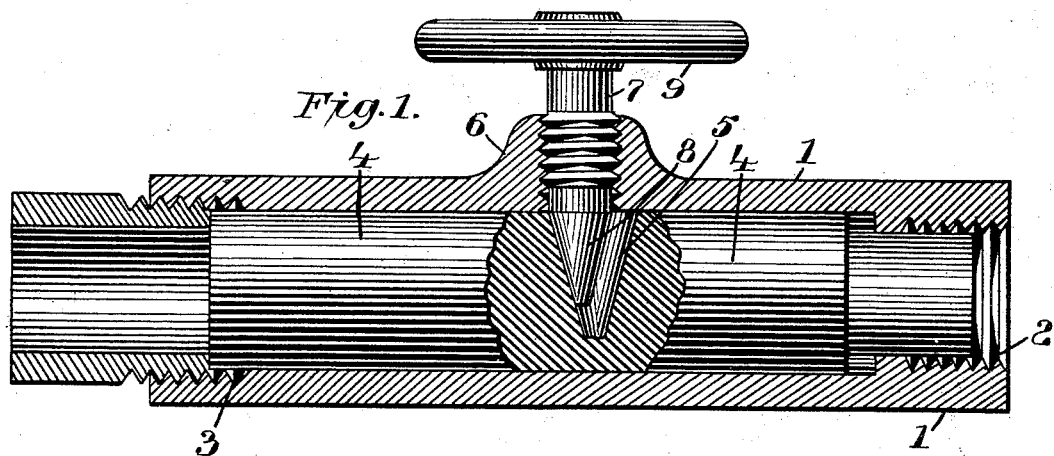
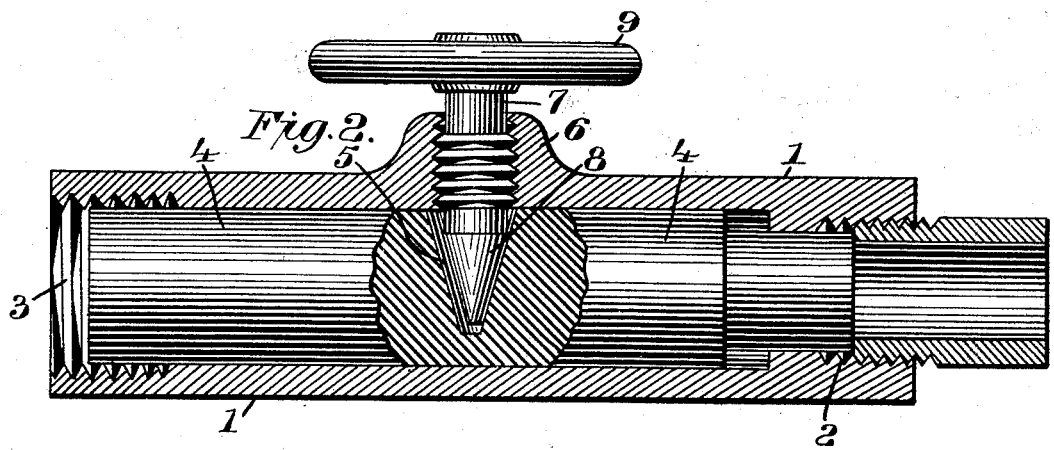
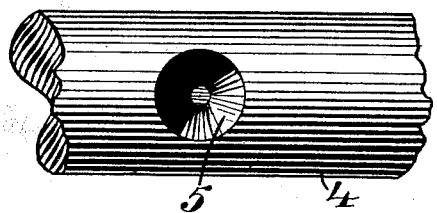
WITNESSES:
Wm J. Tanner
A. J. Tanner
INVENTOR,
Arthur W. Cash
BY
J. H. Hubbard
ATTORNEY.

UNITED STATES PATENT OFFICE.

ARTHUR WISE CASH, OF BRIDGEPORT, CONNECTICUT, ASSIGNOR TO THE ARMSTRONG MANUFACTURING COMPANY, OF SAME PLACE.

NIPPLE-CHUCK.

SPECIFICATION forming part of Letters Patent No. 452,770, dated May 26, 1891.

Application filed February 6, 1891. Serial No. 380,414. (No model.)

*To all whom it may concern:*

Be it known that I, ARTHUR WISE CASH, a citizen of the United States, residing at Bridgeport, in the county of Fairfield and State of Connecticut, have invented certain new and useful Improvements in Nipple-Chucks; and I do hereby declare the following to be a full, clear, and exact description of the invention, such as will enable others skilled in the art to which it appertains to make and use the same.

This invention relates to certain new and useful improvements in nipple-chucks of a class described in a certain other application filed by me of even date herewith, the same consisting, essentially, of a tubular body having threaded seats at each end for the accommodation of the nipple, and a reciprocating plunger, one of whose ends is adapted to cooperate with each of the threaded seats above referred to.

My present invention consists in the means for engaging the plunger with the work and retaining it in such engagement.

In order that those skilled in the art to which my invention appertains may fully understand its construction and method of operation, I will describe the same in detail, reference being had to the accompanying drawings, which form a part of this specification, and in which—

Figures 1 and 2 are vertical longitudinal sections, each showing work as held in one end of the chuck. Fig. 3 is a detail plan of the plunger, showing the tapered seat therein.

The same numerals denote the same parts in each of the figures.

The tubular chuck-body is denoted by 1, and is provided with internal screw-threads 2 3 at its ends.

4 is the plunger seated and longitudinally movable in the chuck-body and having its ends conformed to the diameter of the screw-threaded portion, substantially as shown. Near its center the plunger is provided with a tapered conical recess 5.

6 is a boss or hub formed upon the chuck-body, and through this hub is tapped a screw 7, having a smooth conical point 8, and means for turning it, such as the hand-wheel 9 or an ordinary wrench-hold.

In operating my invention the screw is first withdrawn and the nipple is then screwed into the threaded seat until its end abuts against the end of the plunger. The screw is then turned downward, whereby, through the engagement of its tapered surface with the tapered wall of the seat or recess, the plunger is forced solidly against the end of the nipple. After the required threading has been done to the nipple, the latter may be released by slightly withdrawing the screw, whereby the thrust of the plunger is withdrawn. It will be observed that the tapered seat in the plunger is somewhat larger than the point of the screw. This admits of the use of the screw by bearing upon alternate sides of the seat to force the plunger toward either end of the chuck-body.

I claim—

1. The combination, with the tubular chuck-body, of the longitudinally-movable plunger provided with a tapered seat, of the taper-pointed screw threaded through the chuck-body and engaging the seat, substantially as described.

2. The combination, with the tubular chuck-body having a screw-threaded seat at each end, of the plunger seated within and longitudinally movable relative to said chuck-body, a tapered seat formed in the plunger, a boss upon the tubular chuck-body, and a taper-pointed screw threaded through the boss and having operative engagement with the seat, substantially as described.

In testimony whereof I affix my signature in presence of two witnesses.

ARTHUR WISE CASH.

Witnesses:
SHERMAN HARTWELL HUBBARD,
M. C. HINCHCLIFFE.